United States Patent Office 2,987,312
Patented June 6, 1961

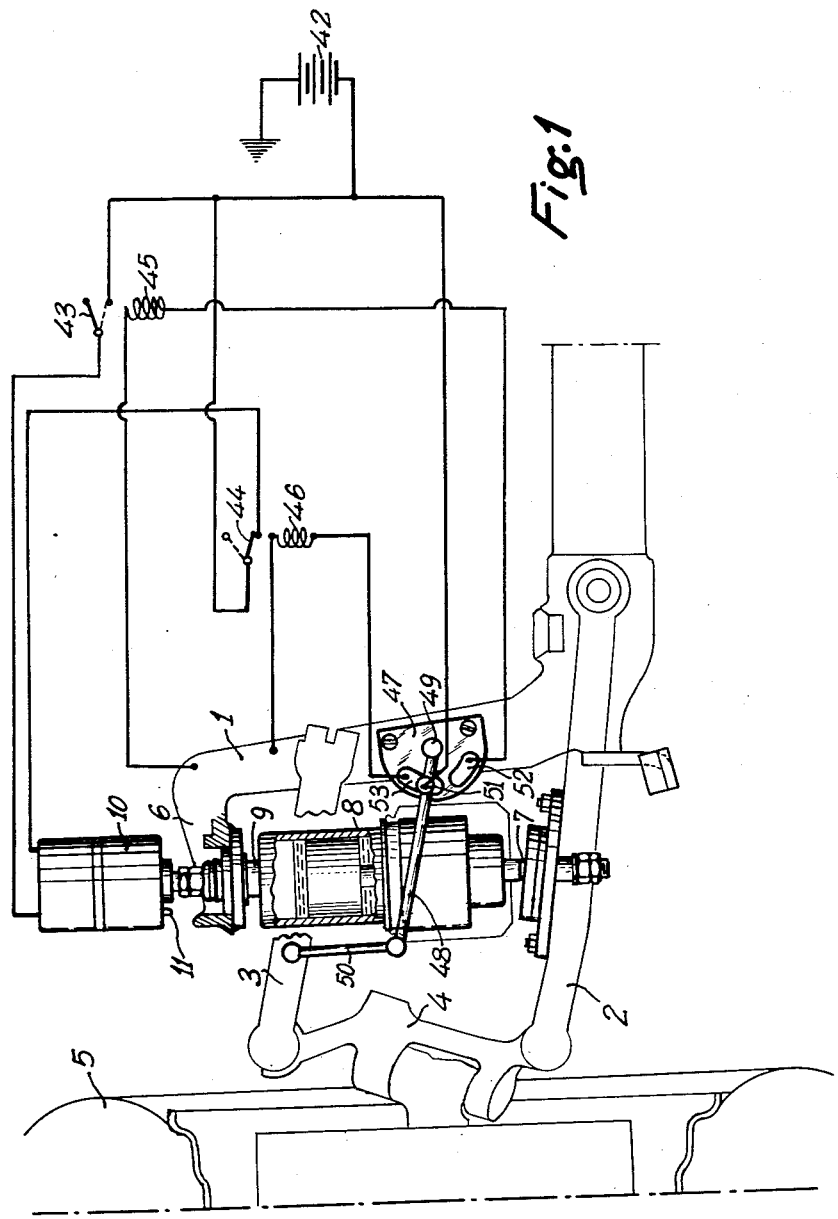

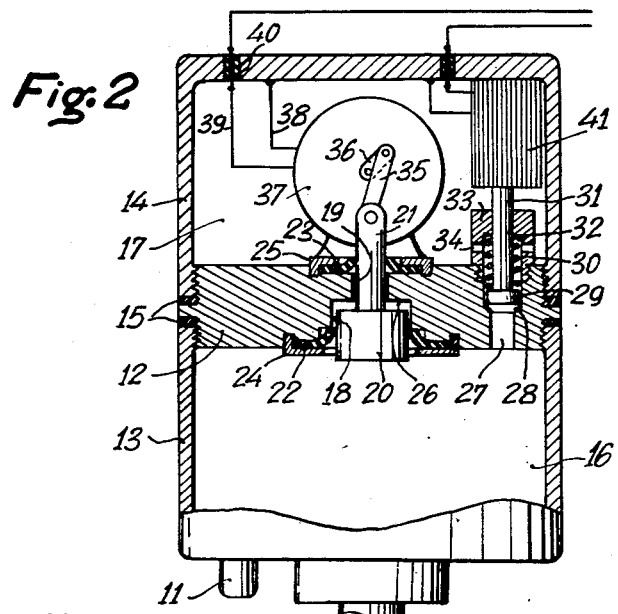
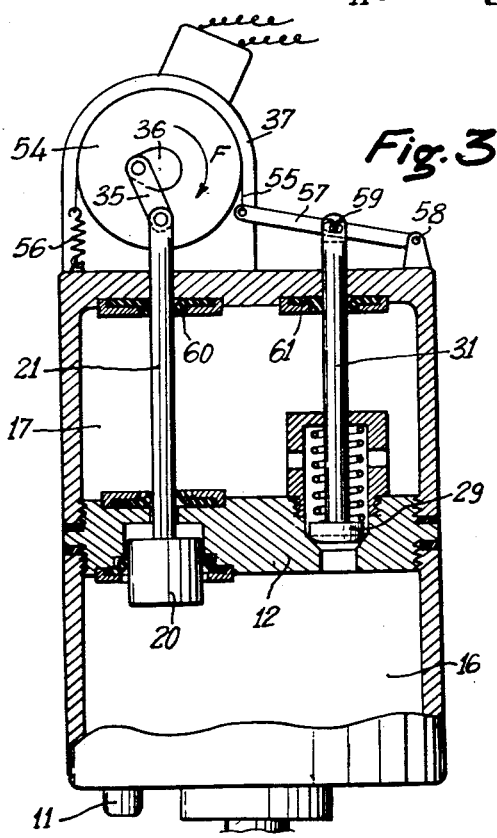

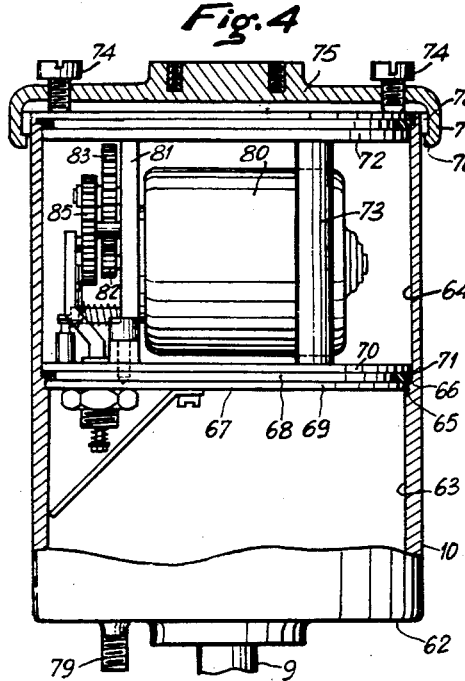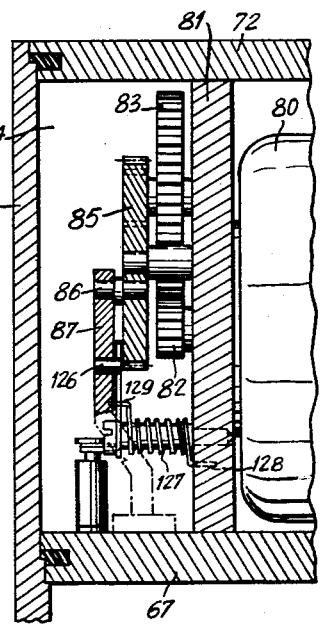

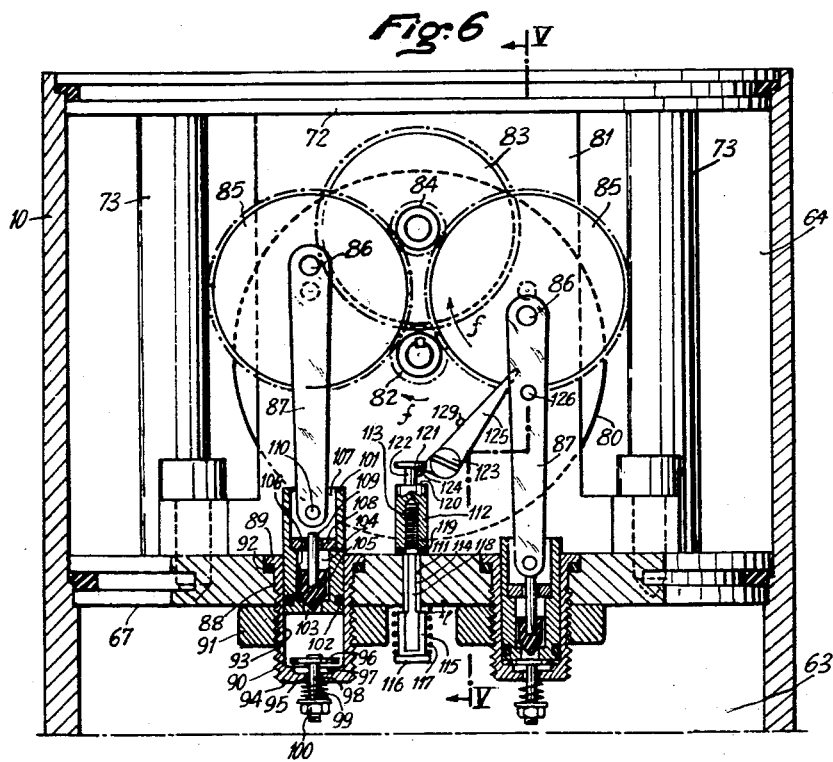

2,987,312
VEHICLE SUSPENSION SYSTEM HAVING A PNEUMATIC MEMBER AND A DEVICE FOR CORRECTING TRIM
Fernand Stanislas Allinquant, 6–10 Rue Olier, Paris, France
Filed Nov. 18, 1958, Ser. No. 774,751
Claims priority, application France Nov. 28, 1957
9 Claims. (Cl. 267—64)

As is well known, correction of the trim of an automobile suspension consists in regulating the bearing force of its elastic member in accordance with the load, in such manner that the chassis of the vehicle when at rest is at a level which is independent of the load, and is able to oscillate vertically on each side of that level, within the normal working limits of amplitude of the suspension.

In suspensions having a pneumatic member, the bearing force depends on the pressure of the compressed air which constitutes the elastic element. In order that the pneumatic member should always be at the same height when at rest, and irrespective of the load, while giving the suspension its normal trim, the pressure of the compressed air may be adapted to the load by diminishing or increasing the quantity of air contained in the deformable casing of the suspension member.

This has been the method hitherto adopted in the suspensions known as the variable air-volume type, which consists in allowing part of the compressed air to escape to the atmosphere, or re-introducing compressed air into the deformable casing. In order to re-introduce air, it is obviously necessary that it should first be brought to a pressure higher than that which exists inside the casing at any moment when the introduction is effected. The equipment of the automobile must therefore include a compressor which is capable of satisfying this condition by drawing air from the atmosphere.

In practice however, the limitations in respect of weight and space imposed on the equipment of an automobile only permit compression ratios of 7 to 8, so that the operating pressures are substantially less than 10 kgs. per sq. cm. The re-introduction of compressed air derived from the atmosphere presents problems of filtration and drying which are particularly awkward in a mobile installation which is subjected to essentially variable ambient conditions. A complicated system of pipes, distributors and valves becomes necessary and this complicates the problem of fluid-tightness. Leakages are inevitable, with the result that either the compressor is overloaded or, if the latter breaks down, the suspension collapses.

The present invention has for its object a means of ensuring the correction of trim in an automobile suspension having a pneumatic member, which eliminates these drawbacks. It is essentially characterised in that the variable-volume chamber, which is provided with compressed gas carrying out the function of an elastic element in the suspension unit, forms part of a fluid-tight chamber which has an inflation valve and comprises a fixed-volume reserve chamber, separate from the variable-volume chamber; two oppositely-directed flow ducts are provided between these two chambers, one of these ducts including a compressor and the other including an air-return valve, the starting-up of the compressor or the opening of the air-return valve producing exchanges of compressed gas in opposite directions between these two chambers, and a variation of the bearing force of the suspension.

The result of this arrangement is that a pneumatic suspension member in accordance with the invention only draws on the quantity of air which is introduced once and for all into its fluid-tight chamber at the time of inflation. This air is first purified and compressed, and for this purpose there are available all the facilities for a fixed installation, so that the equipment of the vehicle is simplified, the risk of leakage is reduced, and the normal compression ratio of a compressor is no longer a limitation on the value of the absolute pressure which may be obtained in the suspension member, since the compressor which forms part of the device further compresses air which has already been compressed.

The invention will be described below with reference to the accompanying drawings which show by way of example forms of construction, in which:

FIG. 1 shows in transverse elevation a wheel suspension of an automobile having an oleo-pneumatic telescopic member comprising the device for the correction of trim which forms the object of the invention, and also shows an electric control diagram of the said correction system;

FIG. 2 shows in cross-section a casing which forms part of the telescopic member in accordance with the invention, in a first form of embodiment;

FIG. 3 is a view of the same casing in a second form of construction, and similar to that of FIG. 2;

FIG. 4 is a view of the same casing in a third form of construction and similar to that of FIG. 2;

FIG. 5 shows on an enlarged scale the left-hand side of FIG. 4, but seen from the opposite direction and in cross-section taken along the line V—V of FIG. 6;

FIG. 6 is a detail view on a larger scale, in a direction perpendicular to those of FIGS. 4 and 5, of the device for the transfer of compressed air, taken in cross-section through the axes of the cylinders of the compressor and of the air-return valve.

In FIG. 1, an element of the chassis of a vehicle has been given the reference 1, and on this member two parallel arms 2 and 3 are pivotally mounted so as to couple the support 4 of a wheel 5 to the chassis. Between a bracket 6 formed at the upper extremity of the chassis member 1 and the lower arm 2, an oleo-pneumatic telescopic member of known type is mounted in known manner, ensuring the elastic and shock-absorbing suspension of the chassis on the carrier-wheel 5. The wheel support 4 and the parallel arms 2 and 3 comprises a loaded suspension member, and bracket 6 integral with the chassis 1 comprises a load supporting suspension member. The rod 7 of its piston is attached to the arm 2 by a pivotal member; at the opposite extremity, the upper end of the cylinder 8 has its coupling rod 9 connected by a flexible joint to the bracket 6. The cylinder contains oil which acts as a shock-absorbing medium for the displacements of the piston, and above this oil, there is a gas under pressure such as compressed air, which serves as an elastic suspension element. The coupling rod 9 is hollow and forms a tube giving free communication with the casing 10 which is located above the bracket 6, and which completes the volume of the chamber reserved for the compressed air, without increasing the length of the telescopic member housed between the bracket 6 of the chassis and the arm 2. The head of the cylinder, above the shock-absorbing oil, forms together with the casing or container 10 a fluid-tight chamber into which the compressed air can be introduced through an inflation valve 11 carried by the casing.

In accordance with the invention (FIGS. 2 and 3) this fluid-tight chamber containing compressed air which serves as an elastic suspension element, is separated into two sections of only slightly different volumes, by a partition 12, which divides the casing. This latter is constituted by two half-casings 13 and 14, screwed to this partition with the interposition of sealing-joints 15 (see FIGS. 2 and 3). Passing through the partition 12, which is fairly thick, are provided two separate ducts for the passage of air between on the one hand the variable-volume chamber 16 formed by the lower portion of the casing and the upper portion of the cylinder communicating through the pipe 9, and on the other hand the fixed-volume chamber or reserve chamber 17, formed by the upper part of the casing. One of these ducts comprises a compressor unit and the other has an air-return valve.

The compressor unit is made up in the following manner. A hole is bored which has a large-diameter portion 18 on the side of the chamber 16 and a small-diameter portion on the side of the chamber 17; in this hole is housed a shouldered member forming a differential piston, the head 20 and the rod 21 of which can slide freely in these bores with a clearance of a few tenths of a millimeter. On the opposite faces of the partition 12, rubber washers 22 and 23 having respectively in the free position a smaller internal diameter than the head 20 and the rod 21 of the piston, are held in position by means of flanged metal ferrules 24 and 25, the flanges of which are embedded in the partition. The introduction of the piston into the bores through these two washers, from the face of the partition which is turned towards the chamber 16, produces a deformation in the same direction of the interior portions of the two washers, which then form in known manner lip-joints which ensure unidirectional tightness. It is understood that a clearance is provided in the lower face of the partition for the lip of the washer 22.

It can immediately be seen that this arrangement prevents the pressure existing in the chamber 16 of the telescopic member, assumed to be at rest, from exceeding the pressure existing in the chamber 17, any excess pressure in the first chamber producing a flow of air from this latter to the second chamber, which passes through the joint 22 and then flows through the interstice due to the diametral clearance formed between the portions of different diameters of the piston and the corresponding bores, and finally passes through the joint 23. It is not possible for any flow to take place in the opposite direction, since any excess pressure applied to the concave face of the lip of one of the joints has the effect of forcing this lip more strongly against the piston, thus ensuring fluid-tightness. It results from this that when the piston 20—21 is stationary, the pressure which exists in the chamber 16 is established in the free space comprised between the joints 22 and 23, especially in the clearance space 26 formed between the head 20 of the piston and the bottom of the large-diameter bore 18. When the piston moves, its displacement toward the bottom causes the compressed air which comes from the chamber 16 to pass into this space 26, while its displacement upwards causes this air to flow back into the chamber 17. The device constitutes a very efficient compressor, since the non-effective space may be only very small, since it corresponds to the clearance of a few tenths of a millimeter existing around the portions of the piston in the bores located between the joints 22 and 23.

The air return valve enables the difference in pressures between these chambers which results from the operation of the compressor, to be eliminated or merely reduced. This valve is mounted in a shouldered bore 27 of the partition 12, and has its seating in the frusto-conical end 28 of the large-diameter portion of this bore; its head 29 is subjected to the action of a spring 30 surrounding the rod 31 and being supported on the bottom of the bore 32 of a guide 33 for this rod, screwed into a threaded hole in the partition; holes 34 put this bore into free communication with the chamber 17. The rigidity of the spring 30 is sufficient to prevent the opening of the air-return valve under the effect of a difference in pressure between the two chambers.

It has been seen that when the shock-absorbing member is at rest, the pressure in the chamber 16 cannot exceed that of the chamber 17, any excess of pressure in the first chamber producing a flow of compressed air towards the second chamber through the joints of the compressor, until the pressures are balanced. On the other hand, when the vehicle is in motion, the movements of compression of the suspension member cause a sudden increase in pressure in the chamber 16, so that the pressure in this latter can momentarily exceed the pressure in the chamber 17, which would initiate a transfer of compressed air into the said chamber 17 without movement of the compressor. However, since the size of the passage is restricted and the movement of oscillation of the suspension is rapid, the movement of recoil which immediately follows the compression movement of the suspension member immediately annuls this excess pressure, so that the transfer of compressed air due to the oscillation of the suspension can never be more than very small. The air-return valve being mounted in the manner shown so as to open towards the chamber 17, the rigidity of the spring 30 should be calculated in such manner that it can withstand the maximum value of excess pressure in the chamber 16 which can result from oscillation of the suspension.

The inflation pressure of the compressed air container formed by the two chambers 16 and 17 is so chosen that for the maximum load of the vehicle, the piston of the suspension member takes up its mean or neutral position. When the load is reduced, the correction of trim is obtained by a back-flow of air from the chamber 16 to the chamber 17 by starting up the compressor; an inverse correction in the event of a further increase in load is obtained by lifting the air-return valve 29.

The two members, both the compressor and the air-return valve, could be actuated by any mechanism of known type and can be controlled by hand. Preference is however given to electric driving devices, the automatic control of which is easy to ensure, in such manner that any alteration in the load of the vehicle which has the effect of displacing the neutral position of the suspension member, produces on its own account a correction of trim by starting up the compressor or lifting the air-return valve until the telescopic member has returned to its neutral position.

In the form of construction shown in FIG. 2, the upper extremity of the rod 21 of the piston of the compressor is coupled by a connecting-rod 35 to a crank 36 of an electric motor 37, the stator of which is rigidly fixed to the casing, and in this particular instance is fixed to the partition 12 and contained in the chamber 17. This motor is a commutator motor; one of its terminals (negative) is connected to earth by a wire 38 soldered to the casing while the other terminal (positive) is connected to the supply circuit which will be described below, by a connection 39 which passes in a fluid-tight manner through the casing, from which it is moreover electrically insulated; this may be carried out in a simple manner through the intermediary of an insulated contact-stud 40 which is embedded in the wall of the casing and to which the internal and external wires are soldered. The valve is subjected to the action of an electro-magnet 41 which has as its moving armature the rod of the valve 31. In the same way as the motor, the coil of the electro-magnet has one of its terminals connected to earth, while the other is connected to a supply circuit by an insulated connection passing through the casing in a fluid-tight manner.

As shown in the electrical diagram in FIG. 1, the device has a source 42 of direct current, which is in principle the battery of the vehicle. This source forms part of two parallel circuits which separately supply the motor and the electro-magnet, each through the intermediary of the normally-open contact 43 or 44 of two time-delay relays. The windings of these relays shown at 45 and 46, form part of two control circuits connected to the current supply in parallel with the two supply circuits, and comprising a common change-over switch intended to close them alternately. This change-over switch has its contact-plate fixed to the chassis member 1 between the two parallel arms 2 and 3. Its moving member is a lever 48 which is pivoted at 49 at the centre of this contact-plate, and the extremity of which is coupled by a connecting rod 50 to one of the arms, the arm 3 for example. The lever 48 carries a moving contact 51 which, depending on the inclination of the lever in the vertical plane, can come into contact with one or the other of two elongated contact studs 52 or 53, these forming part of the separate control circuits of the motor (relay 45) or of the air-return valve (relay 46), or alternatively the said moving contact 51 may occupy a neutral intermediate position corresponding to the neutral position of the telescopic member.

The device will first be considered by assuming that, for an average load on the vehicle and with the vehicle at rest, the telescopic member is in the mean or neutral position, the pressure of the compressed air in this member (chamber 16) being thus sufficient to balance the load for this position. If the load is reduced, the elastic force of the compressed air tends to raise the level of the chassis by expansion of the telescopic member, so that the contact 51 comes on to the stud 52 and closes the control circuit which comprises the relay 45; if the contact is maintained, this time-delay relay is excited, the contact 43 closes to connect the supply of the motor to the source of current 42, thus starting-up the compressor; the transfer of compressed air from the chamber 16 to the chamber 17, produced by the compressor, reduces the pressure acting on the piston of the telescopic member and ensures the withdrawal of this latter until the contact 51 has returned to its neutral position and the suspension has recovered its initial trim. Conversely, an increase in the load on the vehicle results in a lowering of the chassis by compression of the telescopic member, so that the moving contact 51 comes on to the contact 53 and closes the control circuit which comprises the relay 46; if the contact is maintained, the time-delay relay is excited, and the contact 44 closes, which ensures the supply to the electro-magnet; the opening of the air-return valve permits a back flow towards the chamber 16 of a part of the over-compressed air which was previously in the chamber 17; this results in an increase in the pressure which acts on the piston of the telescopic member and an expansion of this member until the contact 51 has returned to the neutral position and the suspension has been restored to its initial trim.

The use of time-delay relays ensures that while the vehicle is running, the oscillations of the suspension, which are accompanied by a rapid movement of the contact 51 to one or the other of the contact studs 52 and 53 in alternating motion, cannot cause the control circuits to be alternately closed. Only the mean position of the telescopic member is operative, namely the position about which it oscillates, and which depends on the load of the vehicle.

The form of embodiment shown in FIG. 3 differs from that which has just been described in that the air-return valve is actuated by the motor by the compressor through the intermediary of a uni-directional transmission mechanism, the direction of rotation of the motor being reversed according to whether it is intended to actuate the compressor without acting on the air-return valve, or to cause this later to open. The uni-directional mechanism may consist, as shown, of a band-brake, the drum 54 of which is rigidly fixed to the driving shaft carrying the crank 36 which actuates the compressor, and the band 55 of which has one extremity fixed to a spring 56 and the other extremity attached to a lever 57, pivoted about a fixed shaft 58 and coupled to the rod of the air-return valve by a sliding pivot 59 (for example, a stud moving in an orifice in the lever). The reversal of the direction of the motor is effected by any usual means, according to whether the current supply is fed to the motor by one or the other of the two supply wires comprising the contacts of relays 43 and 44 of the electrical diagram of FIG. 1. The motor may for example comprise two field windings of opposite directions, or alternatively the direction of the current through the field or the armature may be changed by a change-over switch actuated by a relay.

It will be observed that in the form of construction shown in FIG. 3, the control mechanism is external to the casing, the rods 21 and 31 then passing through holes bored in a wall of the latter, through internal lip-joints 60, 61, mounted as previously described in the case of the joints of the compressor. However, this mechanism may be housed in the casing in the form of construction shown in FIG. 2. This mechanism operates in such manner that when the motor rotates in the direction of the arrow F, it does not act on the air-return valve, since the band of the brake 55 slides on the drum 54 and only the compressor is driven; the compressor is also driven in the reverse direction of rotation, but the air-return valve is then lifted by the tractive effort of the band 55 which tends, as a result of its friction on the drum 54, to be displaced in the direction of rotation of the said drum, in the direction opposite to that of the arrow F. The section of the passage opened by the air-return valve being relatively large, the operation of the compressor in the direction of rotation of the motor last mentioned is practically without effect; the compressor could however be prevented from being driven by coupling the crank 36 to the driving shaft through the intermediary of a free-wheel mechanism which ensures the rotation of the crank only in the direction F.

In the form of embodiment shown in FIG. 4, the casing is formed by a cylinder. This cylinder has two portions of substantially the same length but having bores 63 and 64 of slightly different diameters so as to form a shoulder at two levels 65 and 66, which serves as a support for a separating partition 67. This latter is a disc, the peripheral surface of which is cut by a groove 68 between two cheeks 69 and 70; the first has a diameter corresponding to that of the cylinder between the two levels of its shoulder in order to be supported by the lowest shoulder 65; the second has the same diameter as the portion of cylinder 64 to support a joint washer 71 of the same diameter, housed in the groove 68, and to apply it against the upper level 66 of the shoulder. The partition 67 thus separates the two portions 63 and 64 of the cylinder in a fluid-tight manner, and de-limits a chamber of variable volume comprising the space 63 and the upper space of the suspension cylinder. A fixed-volume chamber is formed by the upper portion 64 of the casing, closed at the upper part of this latter by a second fluid-tight partition 72. This latter is coupled to the partition 67 by columns 73, and its fluid-tightness is effected in a similar manner. The whole is kept in place by pressure screws 74 of a cover 75 fixed to the casing in known manner by engagement of the segments 76 internal to its flange 77 under the segments 78 which project from the wall of the casing.

The bottom 62 of the casing is fitted with a valve 79 for the introduction of air into the container. The transfer of compressed air between the chambers 63 and 64 is effected through the partition 67 in opposite directions by a compressor and by a valve controlled by an electric motor 80 having two directions of rotation and housed in the chamber 64.

The motor 80, connected in any appropriate manner, for example by means of insulated contacts embedded in a wall of the chamber 64, to the external electrical supply device which has been described with reference to FIG. 3, is bolted in a central position on the partition 67. Its speed is highly geared-down by a reduction gear with toothed wheels carried by a plate 81 and comprising for example a pinion 82 keyed on its shaft, an intermediate moving system 83 and 84 and two outer moving systems 85 symmetrically arranged and carrying crank-pins 86 which are displaced by 180° for two connecting rods 87 actuating the pistons of two small compressor cylinders (see FIG. 6).

Each compressive cylinder is formed from a turned part, the outer surface 88 of which carries at one extremity a flange 89, and is threaded on a portion 90 from the other extremity. This part, engaged through the partition 67 from the face directed towards the chamber 64, in a smooth hole, the entrance of which has an enlarged portion of the same diameter as the flange, is locked by a nut 91 which is screwed on its threaded portion and which applies the flange against a sealing washer 92 at the bottom of the said enlarged portion. A bore 93, opening out at the extremity which carries the flange and forming a bottom 94 at the other extremity, forms the cylinder. The bottom 94 is pierced along the axis with an air-inlet hole 95, provided with a valve. The latter is constituted by a disc of foil 96 having as its seating an annular zone of the bottom 94 around a recess 97 in this bottom. This foil is riveted to the end of a rod 98 which passes freely through the hole 95 and is surrounded externally by a spring 99 held by a nut 100 screwed on its threaded extremity.

Each compressor piston is formed by a cylindrical part 101 of the same diameter as the bore of the cylinder, and carrying in a groove an annular sealing-joint 102. The said member is pierced by three coaxial bores of stepped diameters; the smallest bore 103 opens into the cylinder; in the next bore 104 can slide a rubber valve 105, the conical end of which has its seating on the edge of the shoulder formed between the bores 103 and 104, and the sides of which are provided with channels 106 forming air passages; at the bottom of the last bore 107 is forcibly engaged a washer 108 through which passes freely a rod 109 fitted in the valve and forming a shank which guides its movement. In this same bore 107, the connecting rod 87 which actuates the piston is pivoted on a transverse stud 110.

The two-cylinder compressor which has just been described enables the compressed air to be transferred from the variable-volume chamber 63 to the reserve chamber 64; during its upward movement, each piston 101 takes in air from the chamber 63 and lifts the valve 96, and in its down-stroke discharges said air into the chamber 64, the valve 105 being lifted. The spring 99 of the valve 96 is a weak spring which has only a simple return action.

In order to effect the transfer in the opposite direction of a certain quantity of compressed air from the reserve chamber 64 to the variable-volume chamber 63, so as to compensate for an increase in the load on the suspension, an air-return valve is provided as in the forms of construction previously described, but the opening of this valve is effected by the torque of the motor 80 without rotation, as will be described later.

This air-return valve covers the outlet into the chamber 64 of a hole 111 communicating with the chamber 63, pierced through the partition 67 in an intermediate position between the two cylinders of the compressor. The valve comprises a cylindrical part 112 of larger diameter than the hole 111, and a rod passing through the partition 67, through the said hole, and screwed by its upper threaded extremity 113 of smaller diameter into a tapped blind hole in the said cylindrical member. From its upper threaded extremity 113, the rod has the same diameter as the hole 111 over a portion 114, the length of which exceeds by a certain amount 1 the thickness of the partition 67, followed by a larger diameter over a portion 115 terminating in a head 116 and surrounded by a restoring spring 117 interposed between the head and the lower face of the partition 67. Two diametrically-opposite strips 118 extend over the whole length of the portion 114 and over part of the portion 115, forming air passages along the rod inside the hole 111. The shoulder formed at the upper limit of the portion 114 holds a rubber washer 119 against the underface of the valve 112 in order to ensure fluid-tightness of the valve, closed under the action of its spring 117 which is supported by the upper face of the partition 67 around the outlet of the hole 111.

At the upper portion of the air-return valve 112 (see FIGS. 5 and 6), a wide and deep groove 120 forms a head 121 connected to the valve by the stem 122. A shaft 123 with threaded end screwed into the wall 81 at about the same level as the head 121 and on the side, serves as a fixed pivot for a lever with two opposite arms, comprising a short arm bent at right angles and terminating in a finger 124 engaged in the groove 120 under the head 121, and a long straight arm 125 projecting forward into the space in the connecting rod 87 and the disc-crank 85 of this latter, which are located on the same side of the valve 112 as the pivot 123 of the lever, in the zone of action of a stud 126 carried by the said connecting rod. A helicoidal spring 127 surrounding the pivot 123 is embedded at one end 128 in the wall 81 and is supported at its other extremity 129 on the arm 125 of the lever so as to ensure contact of the finger 124 under the head 121, without however its strength being sufficient to overcome that of the spring 117 which returns the air-return valve to its closed position.

When as a result of a reduction in the load on the suspension, the expansion force of the latter causes the chassis of the vehicle to rise above its normal trim position, the supply of the motor 80 corresponds to the direction of rotation indicated by the arrow $f$ in FIG. 6. The connecting-rods 87 are set in motion and the stud 126 comes into contact with the arm 125 at every revolution. It pushes it back and thus the head 121 of the air-return valve is separated from the finger 124 which can then move freely downwards owing to the width of the groove 122. The motor can then rotate in the direction of the arrow $f$, causing the control lever of the valve 112 to click but without actuating the valve. The pistons of the compressor have an alternating movement displaced in phase by 180° and ensure the transfer of compressed air from the space 63 to the space 64. The reduction of the amount of compressed air in the variable-volume chamber of the suspension reduces the lifting force of the latter; the chassis of the vehicle again moves down to its normal trim position, and the motor stops.

If on the other hand the load on the suspension increases, the downward movement of the chassis of the vehicle below its normal trim position causes the supply to be applied to the motor 80, corresponding to the direction of rotation contrary to that of the arrow $f$. As soon as the toothed wheels 85 have made their first revolution, when the connecting rod 87 which carries the stud 126 moves down, this stud meets the arm 125 of the lever and tends to cause it to turn in the direction of the hands of a watch. The finger 124 acts upwards under the head 121 and the air-return valve 112 is lifted until the large-diameter portion 115 of its rod abuts against the partition 67, which stops the pivotal movement of the lever which then locks the rotation of the motor. As long as the motor remains excited, its torque applied to the lever holds the valve 112 open, and the over-compressed air in the chamber 64 flows slowly through the channels of very small section formed by the strips 118 of the valve rod in the bore 111. The additional supply of compressed air to the chamber 63 increases the pressure, and the expansion force of the suspension increases; the chassis of the vehicle rises until it reaches its position of normal trim, which interrupts the supply of the motor and permits the air-return valve to re-close.

In the three forms of embodiment described, the modification of the pressure in the telescopic member to correct the changes of trim due to a variation of the load is obtained from an inflation pressure which corresponds to the maximum load on the vehicle. Since the inflation is carried out by the use of a fixed installation, this pressure can be substantially higher than that which can be obtained, as in the case of known devices, by the compression of air starting from atmospheric pressure by means of a pumping or compression equipment forming part of the equipment of the vehicle. In addition, the changes of pressure resulting from a transfer of compressed air between two chambers which form part of the same fluid-tight container, all risk of leakage due to the couplings of the conduits is eliminated, and all filters or air dryers are dispensed with, since the air used for inflation is purified in the fixed installation.

A numerical example will give an idea of the possibilities offered by the device which forms the object of the invention. It is assumed that the dimensions of the suspension member are such that the pressure necessary to balance the static load must vary from 10 to 20 kgs. per sq. cm. for the maximum loads admissible for the vehicle, and that the reserve chamber has the same volume as the variable-volume chamber when the suspension is in the neutral position, the inflation being carried out at a maximum pressure of 20 kgs. per sq. cm. For the minimum load, the compressor must deliver compressed air from the variable-volume chamber into the reserve chamber, until the pressure in the first has fallen to 10 kgs. per sq. cm., and the pressure in the reserve chamber will then be 30 kgs. per sq. cm., which corresponds to a ratio of compression not exceeding 3. A compression ratio of this order can be easily obtained by means of piston compressors such as those described, but a rotary compressor could also be employed.

It will be noted that it is not essential for the arrangement to be, as it has been shown, such that the pressure in the variable-volume chamber is equal to or less than that of the reserve chamber when the suspension is at rest. The arrangement could be the inverse, the compressor having with respect to the separating partition, a position symmetrical with that which is shown (this can always be the case for the air return valve). The inflation pressure should then correspond to the minimum load. This solution however would appear to be less advantageous than that which has been described.

What I claim is:

1. In a vehicle having body means including a frame, and support means for movably supporting said body means on a surface, said support means including moving means for moving over said surface, a loaded suspension member pivotally connected to said frame and supporting said moving means, a load supporting suspension member integral with the frame, and a shock absorbing member of the piston and cylinder type operatively connected between said loaded suspension member and said load supporting suspension member to resiliently support said load supporting suspension member with respect to the loaded suspension member; a fluid-tight container, having a rigid outer wall, mounted adjacent said shock absorbing member; conduit means connecting said container with said shock absorbing member; a rigid partition in said container defining; one side and in connection with said shock absorbing suspension member a variable volume chamber, and on the other side a fixed volume reserve chamber, said partition being provided with two fluid flow passages between said chambers; a compressor arranged in one of said passages for transferring fluid from one of said chambers to the other in one direction; a non-return valve arranged in the other passage and biased to close said passage, said non-return valve for controlling flow of fluid in the reverse direction; an inflation valve mounted in said container rigid wall for introducing air into said variable volume chamber until the pressure inside said chamber is sufficient to give to said load supporting suspension member and to the vehicle frame for a predetermined value of the load a given trim with respect to said loaded suspension member and to said moving means; electric operating means for operating said compressor and opening said non-return valve; a source of electric current; connecting means, including switching means, connecting said electric operating means and said source of current; and electric control means responsive to a change in said trim for operating said switching means to energize said compressor and said non-return valve means in accordance with the direction of said change, thereby adjusting the pressure in said variable volume chamber to restore said normal trim upon a modification of the load.

2. A vehicle suspension system as claimed in claim 1, in which said compressor comprises a piston and cylinder, said cylinder being formed in said partition with an outlet toward said reserve chamber and a bottom projecting into said variable-volume chamber; an air inlet formed through said cylinder bottom, and a spring valve for controlling said air inlet; said piston projecting from the outlet of said cylinder and having an air-outlet duct pierced through it and containing a valve for controlling said air outlet.

3. A vehicle suspension system as claimed in claim 1, in which said compressor comprises a differential piston having two portions of different diameters; two coaxial bores formed in said partition, said bores being respectively adapted to receive said portions of different diameters in freely-sliding relation; a compression space formed by the bottom of the larger-diameter bore, said space being isolated from both said chambers by lip-joints having the same direction and respectively applied against both said portions of different diameters.

4. A vehicle suspension system as claimed in claim 1, and further comprising: an orifice having its outlet in said reserve chamber and forming a connection with said variable-volume chamber; a non-return valve adapted to fluid-tightly close said outlet, a rod carried by said valve through said orifice, said rod having a portion of diameter substantially equal to that of said orifice, and an enlarged head inside the variable volume chamber, a spring mounted around said rod between said partition and said head to close the valve; and at least one air-flow passage of very small section formed longitudinally in said rod portion of the valve.

5. A vehicle suspension system as claimed in claim 1, in which the said compressor is driven by an electric motor and said air non-return valve is operated by an electro-magnet.

6. A vehicle suspension system as claimed in claim 1, in which said compressor is a piston compressor, and further comprising: an electric motor having two directions of rotation for driving said compressor; a crank-rod coupling said motor to said compressor; and means for actuating said air non-return valve from said motor, said actuating means including a uni-directional transmission mechanism adapted to act on said valve for one direction of rotation only of said motor.

7. A vehicle suspension system as claimed in claim 1 and further comprising: means for driving said compressor; means for lifting said air non-return valve, said lifting means including an arm of a pivoted lever; a second arm on said lever opposite said first arm, said second arm projecting into the path of a stud carried by said compressor driving means; and an abutment to limit rotation of said lever during its pivotal movement in lifting said valve, whereby further rotation of said compressor driving means is prevented in the direction producing the lifting of said air non-return valve.

8. A vehicle suspension system as claimed in claim 1, in which the inflation pressure of said fluid-tight container corresponds at least to the maximum load to be placed on said suspension; and in which the correction of the lifting force is effected, for lowering, by delivery of compressed air into said reserve chamber from said variable volume chamber and, for raising, by transfer in the reverse direction by opening said air non-return valve.

9. In a vehicle having a suspension system of the piston and cylinder type resiliently mounting wheels on an approximately horizontal chassis, a pneumatic device for maintaining the horizontal trim of said chassis on said wheels under variations in loads, said device comprising means defining closed chambers, one said chamber in connection with the cylinder of said suspension system comprising a variable volume chamber and the second said chamber comprising a fixed volume chamber, means defining passages between said chambers for the passage of pressure fluid therebetween, means for inflating both said chambers with clean filtered pressure fluid to horizontally trim said chassis under a preselected full load, compressor means mounted in one passage for transfering to and storing in the fixed volume chamber said pressure fluid from the variable volume chamber, valve means in the other passage for controlling the flow of stored pressure fluid from said fixed volume chamber to said variable volume chamber, control means attached to said chassis and adapted to respectively actuate said compressor means and said valve means responsive to changes in horizontal trim of said chassis caused by decreasing and increasing said chassis load whereby pressure fluid is transferred into and out of said variable volume chamber from said fixed volume chamber in amounts to restore said horizontal trim of said chassis.

References Cited in the file of this patent

UNITED STATES PATENTS

| | | |
|---|---|---|
| 1,650,680 | Youse | Nov. 29, 1927 |
| 2,828,139 | Lautzenhiser | Mar. 25, 1958 |